Figure 1:
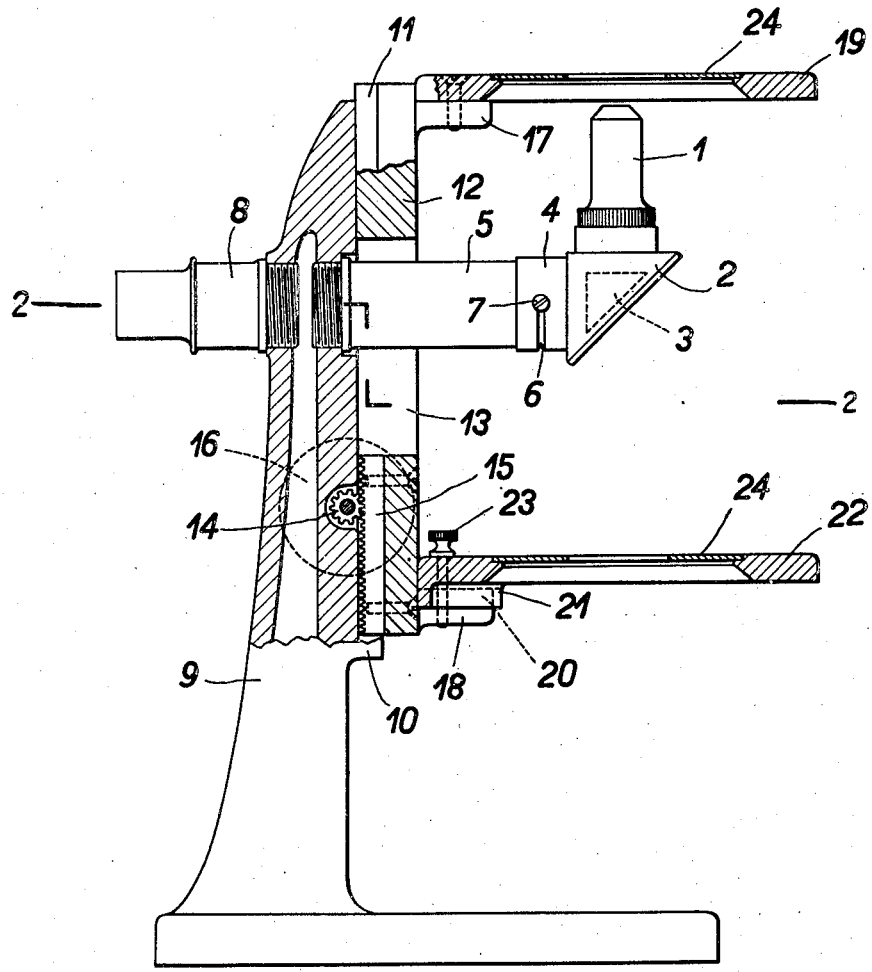

Jan. 15, 1935. F. HAUSER 1,987,776
MICROSCOPE HAVING A DEVIATED PATH OF IMAGING RAYS
Filed Aug. 2, 1934 2 Sheets-Sheet 1

Inventor:
Friedrich Hauser

Patented Jan. 15, 1935

1,987,776

UNITED STATES PATENT OFFICE 1,987,776

MICROSCOPE HAVING A DEVIATED PATH OF IMAGING RAYS

Friedrich Hauser, Jena, Germany, assignor to Carl Zeiss, Jena, Germany

Application August 2, 1934, Serial No. 738,081 In Germany August 4, 1933

8 Claims. (Cl. 88—39)

I have filed an application in Germany, August 4, 1933.

The ever increasing use of incident light in bioligical microscopy entails that microphotographic devices for illuminating objects with both transmitted light and incident light are becoming adopted more and more, these devices being frequently applied with the usual microscopes whose stage may be raised and lowered and which have one of the customary microphotographic cameras. In this case, incident light has the disadvantage that only comparatively small objects may be placed on the stage. When viewing objects by means of one of the microscopes for metallographical purposes that have the object stage above the objective and in which the object surface to be examined is placed on the surface of the stage, objects of greater dimensions may be examined with incident light, but examinations with transmitted light require the object to be so placed on the stage that the cover glass, and not the object slide, is turned downwardly.

The invention concerns a microscope, especially a microscope for microphotographic purposes whose stand has a stage bracket and which does not have the said disadvantages, namely a microscope in which the path of the imaging rays is deviated from the vertical axis of the objective at approximately right angles by means of a reflecting system disposed behind the objective. According to the invention, this microscope offers the advantages of both the said kinds of illumination when the stand has a device for attaching the objective and the reflecting system in two positions for use in which the imaging rays enter these optical parts in reverse directions, and when the stage bracket is so constructed that an object stage may be connected to it in two positions, the one position being above and the other position being below the objective. With a view to effecting the necessary focusing adjustments, the tube and all the optical parts for producing the image may be made displaceable on the microscope stand relatively to the stationary object stage. Nevertheless, it is more convenient to provide that the stage bracket is adjustable along the said stand or the object stage along the stage bracket.

The inventive idea may be carried into practice by different constructions of the new microscope. The stage bracket may have, for instance, two stages whose upper surfaces represent supports for the object. When it is desired to examine with this instrument objects of great dimensions, which are to lie during the observation on the support for the base of the microscope direct, it is advisable that the lower of the two object stages is removable. This second object stage may be dispensed with entirely when the stage bracket is so constructed that a stage may be attached alternatively above and below the objective.

Another advantageous construction of the instrument is obtained by so connecting the stage bracket to the stand that it is rotatable about an axis at right angles to that of the objective and by providing the said bracket with an object stage whose two surfaces represent supports for objects or by mounting on this bracket an object stage only one surface of which may support objects and which may be given two positions for use in which the two surfaces are interchanged.

Evidently, after a rotation of the stage bracket not only the objective but also the reflecting system are to assume positions which permit the examination of an object on the stage when this stage assumes the other position for use. It is advisable to provide that at least the reflecting system is rotatable about an axis at right angles to the axis of the objective and to so connect this system to the stage bracket as to make it partake of the rotations of this bracket. Instead of using two objectives whose pencils of imaging rays are deviated into the direction of observation alternatively by means of the reflecting system, it may be advisable to provide only one objective that partakes of the rotation of the reflecting system.

Figure 4:
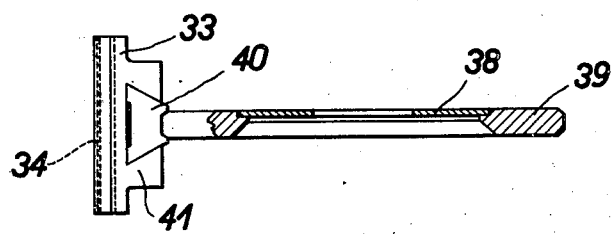
Figure 2:
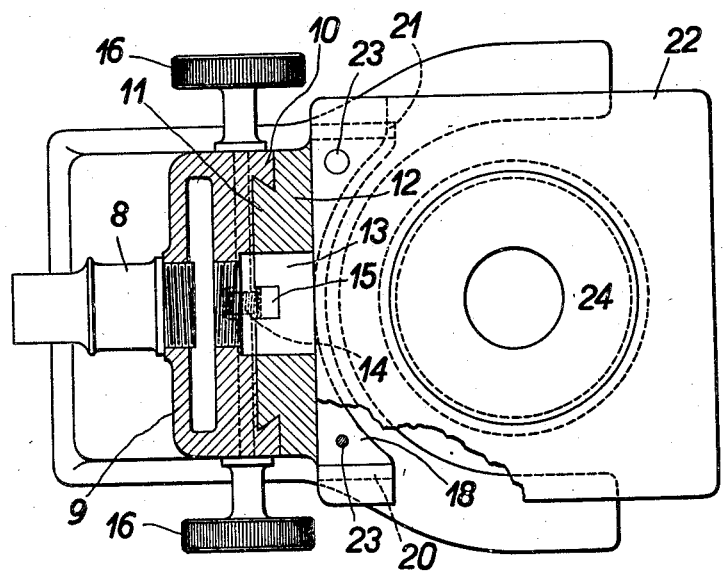
Figure 3:
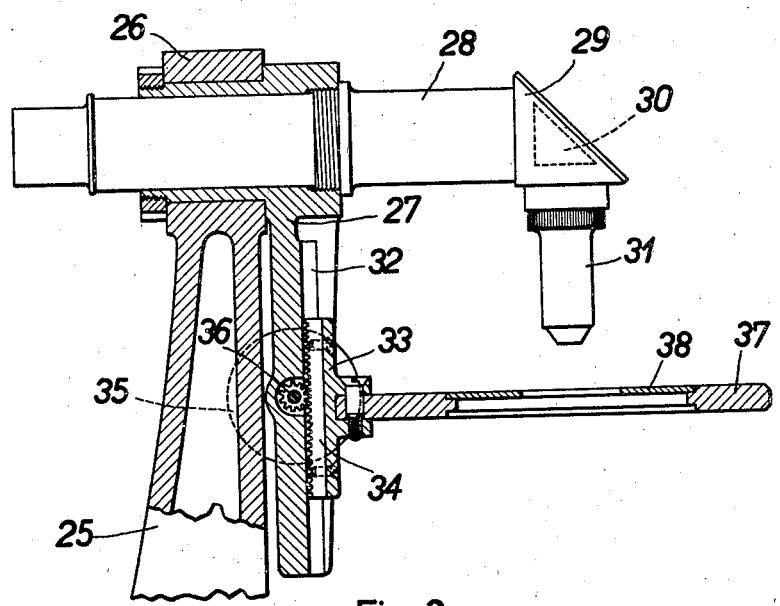

The accompanying drawings illustrate two constructional examples of the invention. Figure 1 shows the one constructional example in part-sectional elevation. Figure 2 represents a section through the line 2—2 in Figure 1. The second constructional example is represented in part-sectional elevation by Figure 3. Figure 4 showing another constructional form of a single part of this second constructional example. The said two examples principally concern microscopes for microphotographic purposes which may be used with incident as well as with transmitted light. The illumination devices are omitted in the drawings, since any kind of microscopic illumination device may be used.

The objective 1 of the first constructional example (Figures 1 and 2) has a vertical axis and is attached to a prism housing 2 containing a prism 3 of the form of a rectangular isosceles triangle, this prism so deviating the imaging rays as to make them horizontal. The prism housing 2 is provided with a sleeve 4 which surrounds the front part 5 of the microscope tube and has a slit 6 for a pin 7 screwed to the part 5, this slit extending over half the circumference of the sleeve 4. The rear part of the microscope tube, which contains an eye-piece, is designated 8. The two parts 5 and 8 of the tube are so screwed to the microscope stand 9 that their axes are horizontal and coincide. The stand 9 has a guide 10 parallel to the axis of the objective and guiding vertically a stage bracket 12 provided with a corresponding slide. The stage bracket 12 has a longitudinal aperture 13 for the tube part 5. In the stand 9 is mounted a pinion 14 which cooperates with a rack 15 screwed to the lower part of the stage bracket 12 and actuated by means of milled heads 16. Above and below, the stage bracket has parts 17 and 18 respectively, for the object stages, the upper part 17 being screwed to an object stage 19 and the lower part 18 being provided with a horizontal guide 20 for a slide 21 attached to an object stage 22. The slide 21 may be secured against displacement by means of pins 23. The upper surfaces of the two stages 19 and 22 represent supports for the objects and have circular pieces 24 for reducing the stage aperture.

The object to be examined is placed on one of the stages 19 or 22 and the fine focusing adjustment of the microscopic image is effected by raising or lowering the stage bracket 12 by means of the milled heads 16. When the upper stage 19 is used, the objective 1 is in the position represented in the drawings, and when the lower stage 22 is used, the objective 1 and the prism housing 2 are to be so rotated about the axis of the microscope tube 5, 8 and through the slit 6 that the objective 1 is inclined downwardly. Subsequently to a removal of the pins 23, the lower stage 22 may be taken away from the stage bracket 12 by withdrawing the slide 21 from the guide 20. In this case, objects may be examined which, on account of their dimensions, may not rest on the stage 22 but are to be placed direct or by means of a special support on the surface supporting the microscope base. When the parts 17 and 18 of the stage bracket 12 are provided with a corresponding slide guide, the stage 22 may be attached at option above or below, and the stage 19 may be dispensed with.

In the second constructional example (Figure 3), the microscope stand 25 has a horizontal bearing 26 in which a stage bracket 27 is rotatably mounted. The tube 28 of a microscope is so screwed into the bracket 27 that the tube axis coincides with the axis of the bearing 26. The tube 28 has a prism housing 29 which contains a prism 30 of the form of a rectangular isosceles triangle and to which is attached an objective 31. The stage bracket 27 has a slide guide 32 parallel to the axis of the objective 31. In the guide 32 is mounted a slide 33 having a rack 34 in mesh with a pinion 36 in the stage bracket 27 and rotatable by means of a milled head 35. To the slide 33 is screwed an object stage 37 whose two surfaces represent supports for microscopic objects and may be provided with a diaphragm 38 for restricting the aperture in the stage. An object stage 3ℓ (Figure 4) of another form may be substituted for the object stage 37. Only one of the surfaces of the said stage 39 may receive the part 38. The stage 39 has a slide 40 displaceable in a slide guide 41 to be provided on the slide 33.

The stage 37 may be adjusted at option either above or below the objective 31 by rotating the stage bracket 27 in the bearing 26, the objective 31 and the prism housing 29 as well as the tube 28 partaking of this rotation. When the said stage 37 assumes the upper position, the objective 31 is directed upwardly, and when the stage 37 assumes the lower position, the objective is directed downwardly. The object to be examined is placed on the stage 37, eventually after the diaphragm 38 has been placed on the upper stage surface. The microscopic image is finely adjusted by rotating the milled head 35, which entails a corresponding displacement of the slide 33 and, accordingly, an upward displacement of the stage 37. When using the object stage 39, and when the lower position of the stage is to be exchanged for the upper position, the slide 40 is to be removed from its guide 41 and to be reversely so inserted that the surface for holding the object is above. Subsequently to a removal of the stage 39, objects of greater dimensions may be examined, these objects being placed direct on the surface supporting the microscope or on a special support.

I claim:

1. A microscope, especially for microphotographic purposes, comprising a stand, a microscope tube having a horizontal axis, a microscope objective, the axis of this objective being vertical, a reflecting system disposed behind the said objective and adapted to deviate the imaging rays emanating from the objective into the direction of the said microscope tube, means for attaching the said objective and the said reflecting system in two positions for use to the microscope tube, the direction of the imaging rays entering the said objective being in the one of the said positions reverse to the direction in the other position, a stage bracket disposed on the said stand, and an object stage, the said stage bracket being adapted to support the object stage in such a manner that this stage is either above or below the said objective.

2. In a microscope according to claim 1, means for raising and lowering the said stage bracket along the said stand.

3. In a microscope according to claim 1, means for raising and lowering the said object stage along the said stage bracket.

4. A microscope, especially for microphotographic purposes, comprising a stand, a microscope tube having a horizontal axis, a microscope objective, the axis of this objective being vertical, a reflecting system disposed behind the said objective and adapted to deviate the imaging rays emanating from the objective into the direction of the said microscope tube, means for attaching the said objective and the said reflecting system in two positions for use to the microscope tube, the direction of the imaging rays entering the said objective being in the one of the said positions reverse to the direction in the other position, a stage bracket disposed on the said stand, an object stage, the said stage bracket being adapted to support the object stage in such a manner that this stage is either above or below the said objective, and another object stage, this other object stage being disposed on the said stage bracket, the upper surfaces of the two said object stages being adapted to support microscopic objects.

5. In a microscope according to claim 4, at least the lower of the two said object stages being detachably connected to the said stage bracket.

6. A microscope, especially for microphotographic purposes, comprising a stand, a microscope tube having a horizontal axis, a microscope objective, the axis of this objective being vertical, a reflecting system disposed behind the said objective and adapted to deviate the imaging rays emanating from the objective into the direction of the said microscope tube, means for attaching the said objective and the said reflecting system in two positions for use to the microscope tube, the direction of the imaging rays entering the said objective being in the one of the said positions reverse to the direction in the other position, a stage bracket disposed on the said stand, and an object stage, the said stage bracket being adapted to support the object stage in such a manner that this stage is either above or below the said objective, the said stage bracket being so mounted on the said stand as to be rotatable about the axis of the said microscope tube.

7. In a microscope according to claim 6, the two surfaces of the said object stage being adapted to support microscopic objects.

8. In a microscope according to claim 6, the said reflecting system being rigidly so connected to the said stage bracket as to partake of the rotations of this bracket.

FRIEDRICH HAUSER.